(12) United States Patent
Draper et al.

(10) Patent No.: US 7,787,996 B2
(45) Date of Patent: Aug. 31, 2010

(54) DETERMINING OPTIMAL TURBINE OPERATING TEMPERATURE BASED ON CREEP RATE DATA AND PREDICTED REVENUE DATA

(75) Inventors: Sam D. Draper, Simpsonville, SC (US); Scott M. Hoyte, Marietta, GA (US); Eric Gebhardt, Roswell, GA (US); Erin K. Bauknight, Seneca, SC (US)

(73) Assignee: General Electric Company, Schenectady, NY (US)

( * ) Notice: Subject to any disclaimer, the term of this patent is extended or adjusted under 35 U.S.C. 154(b) by 388 days.

(21) Appl. No.: 11/971,977

(22) Filed: Jan. 10, 2008

(65) Prior Publication Data

US 2009/0178417 A1     Jul. 16, 2009

(51) Int. Cl.
*G01L 1/00* (2006.01)
(52) U.S. Cl. .................... 700/287; 702/34; 702/43
(58) Field of Classification Search ............ 702/33, 702/34, 35, 36, 41, 42, 43; 700/287
See application file for complete search history.

(56) References Cited

U.S. PATENT DOCUMENTS 6,594,619 B1 * 7/2003 von Flotow ............... 702/184
2006/0201257 A1 * 9/2006 Soechting et al. ........... 73/802

* cited by examiner

*Primary Examiner*—Ryan A Jarrett
(74) *Attorney, Agent, or Firm*—Mark E. Henderson; Ernest G. Cusick; Frank A. Landgraff (57) ABSTRACT

A method of operating a turbine, the method including the steps of: 1) gathering measured creep data for a blade while the turbine operates at different operating temperatures, the measured creep data comprising at least a measured creep rate for the blade (wherein the different operating temperatures include at least a first operating temperature and a second operating temperature); and 2) given the measured creep data for the blade while the turbine operated at the first operating temperature and the measured creep data for the blade while the turbine operated at the second operating temperature, determining whether operating the turbine at the first operating temperature or the second operating temperature is more economically efficient.

16 Claims, 7 Drawing Sheets

DETERMINING OPTIMAL TURBINE OPERATING TEMPERATURE BASED ON CREEP RATE DATA AND PREDICTED REVENUE DATA

BACKGROUND OF THE INVENTION

This present application relates generally to methods and systems for determining turbine blade deformation. More specifically, but not by way of limitation, the present application relates to methods and systems for measuring turbine blade deformation while the turbine is operating.

The turbine blades of industrial gas turbines, steam turbines, and aircraft engines operate in a high temperature environment, where the temperatures regularly reach between 600° C. and 1500° C. Moreover, the general trend is to increase the turbine operating temperatures to increase output and engine efficiencies. Thermal stresses placed on the turbine blades associated with these conditions are severe.

In general, turbine blades undergo high level of mechanical stress due to the forces applied via the rotational speed of the turbine. These stresses have been driven to even higher levels in an effort to accommodate turbine blade design that include higher annulus areas that yield higher output torque during operation. In addition, the desire to design turbine blade tip shrouds of greater surface area has added addition weight to the end of the turbine blade, which has further increased the mechanical stresses applied to the blades during operation. When these mechanical stresses are coupled with the severe thermal stresses, the result is that turbine blades operate at or close to the design limits of the material. Under such conditions, turbine blades generally undergo a slow deformation, which is often referred to as "metal creep." Metal creep refers to a condition wherein a metal part slowly changes shape from prolonged exposure to stress and high temperatures. Turbine blades may deform in the radial or axial direction.

Similarly, compressor blades undergo a high level of mechanical stress due to the forces applied via the rotational speed of the compressor. As a result compressor blades also may undergo the slow deformation associated with metal creep.

As a result, the turbine blade and compressor blade failure mode of primary concern in a turbine is metal creep, and particularly radial metal creep (i.e., elongation of the turbine or compressor blade). If left unattended, metal creep eventual may cause the turbine or compressor blade to rupture, which may cause extreme damage to the turbine unit and lead to significant repair downtime. In general, conventional methods for monitoring metal creep include either: (1) attempting to predict the accumulated creep elongation of the blades as a function of time through the use of analytical tools such as finite element analysis programs, which calculate the creep strain from algorithms based on creep strain tests conducted in a laboratory on isothermal creep test bars; or (2) visual inspections and/or hand measurements conducted during the downtime of the unit. However, the predictive analytical tools often are inaccurate. And, the visual inspections and/or hand measurements are labor intensive, costly, and, often, also yield inaccurate results.

In any case, inaccurate predictions as to the health of the turbine or compressor blade, whether made by using analytical tools, visual inspection or hand measurements, may be costly. On the one hand, inaccurate predictions may allow the blades to operate beyond their useful operating life and lead to a blade failure, which may cause severe damage to the turbine unit and repair downtime. On the other hand, inaccurate predictions may decommission a turbine or compressor blade too early (i.e., before its useful operating life is complete), which results in inefficiency. Accordingly, the ability to accurately monitor the metal creep deformation of turbine and/or compressor blades may increase the overall efficiency of the turbine engine unit. Such monitoring may maximize the service life of the blades while avoiding the risk of blade failure. In addition, if such monitoring could be done without the expense of time-consuming and labor-intensive visual inspections or hand measurements, further efficiencies would be realized. Thus, there is a need for improved systems for monitoring or measuring the metal creep deformation of turbine and compressor blades.

BRIEF DESCRIPTION OF THE INVENTION

The present application thus describes a method of operating a turbine, the method including the steps of: 1) gathering thermal profile data for a blade while the turbine operates at different operating temperatures; 2) gathering operating conditions data for the turbine while the turbine operates at the different operating temperatures, including at least a rotational speed of the turbine; 3) based on the rotational speed of the turbine at the different operating temperatures, determining the mechanical stress applied to the blade; 4) given the thermal profile data for the blade and the mechanical stress applied to the blade, calculating predicted creep rate data for the blade while the turbine operates at the different operating temperatures (wherein the different operating temperatures include at least a first operating temperature and a second operating temperature); and 5) given the predicted creep rate data for the blade while the turbine operated at the first operating temperature and the predicted creep rate data for the blade while the turbine operated at the second operating temperature, determining whether operating the turbine at the first operating temperature or the second operating temperature is more economically efficient.

The present application further describes a method of operating a turbine, the method including the steps of: a) gathering thermal profile data for a blade while the turbine operates at a first operating temperature; b) gathering operating conditions data for the turbine while the turbine operates at the first operating temperature, including at least a rotational speed of the turbine while the turbine operates at the first operating temperature; c) based on the rotational speed of the turbine, determining the mechanical stress applied to the blade; d) given the thermal profile data for the blade and the mechanical stress applied to the blade, calculating predicted creep rate data for the blade while the turbine operates at the first operating temperature; e) repeating steps "a" through "d" while the turbine operates at a second operating temperature; and f) given the predicted creep rate data for the blade while the turbine operated at the first operating temperature and the predicted creep rate data for the blade while the turbine operated at the second operating temperature, determining whether operating the turbine at the first operating temperature or the second operating temperature is more economically efficient.

The present application further describes a method of operating a turbine, the method including the steps of: 1) gathering measured creep data for a blade while the turbine operates at different operating temperatures, the measured creep data comprising at least a measured creep rate for the blade (wherein the different operating temperatures include at least a first operating temperature and a second operating temperature); and 2) given the measured creep data for the blade while the turbine operated at the first operating temperature and the measured creep data for the blade while the turbine operated at the second operating temperature, determining whether operating the turbine at the first operating temperature or the second operating temperature is more economically efficient.

These and other features of the present application will become apparent upon review of the following detailed description of the preferred embodiments when taken in conjunction with the drawings and the appended claims.

DETAILED DESCRIPTION OF THE INVENTION

Figure 1:
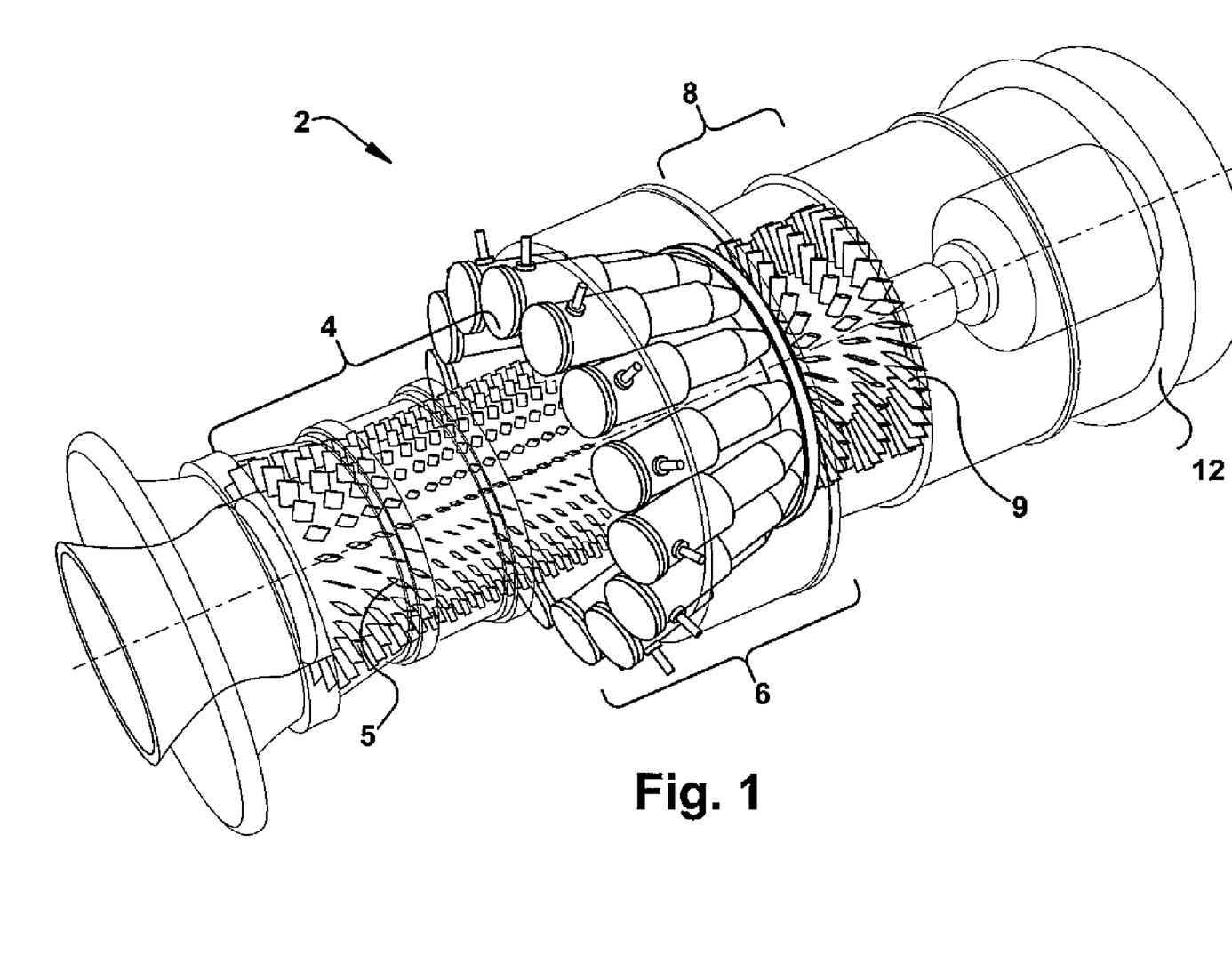
FIG. 1 is a perspective cut-away view of a gas turbine demonstrating an exemplary turbine in which an embodiment of the present invention may be used.
Figure 2:
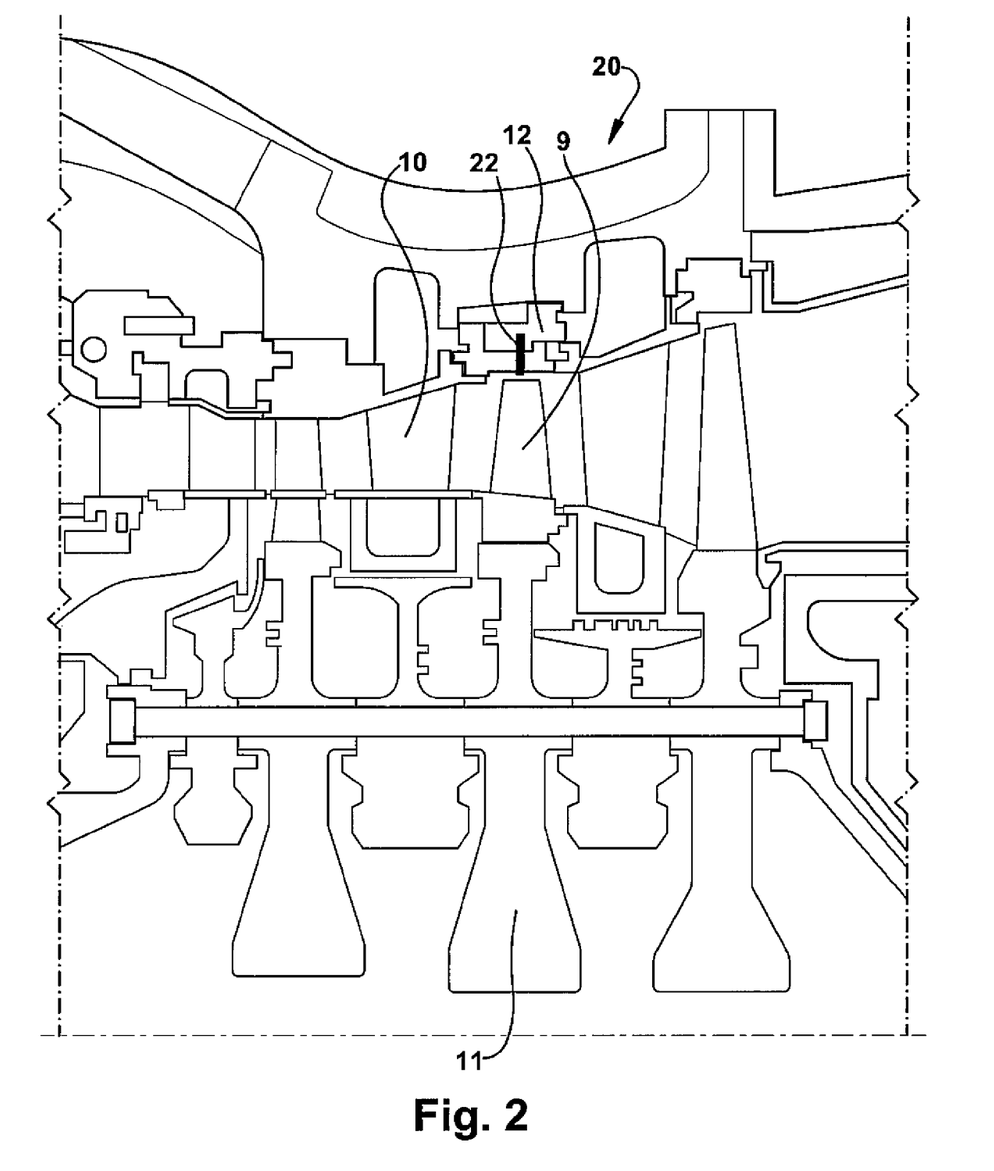
FIG. 2 is a cross-sectional view of the gas turbine of FIG. 1 demonstrating an exemplary embodiment of the present invention.

A technique has been developed to measure accurately, reliable, and at a relatively low cost the deformation of turbine blades in real time, i.e., as the gas turbine is operating. Referring now to FIG. 1, a typical gas turbine 2 is illustrated in which exemplary embodiments of the present invention may be used. While FIG. 1 depicts a gas turbine, it is understood that the present invention also may be used in steam turbines also. As shown, the gas turbine 2 may include a compressor 4, which may include several stages of compressor blades 5, which compresses a working fluid, i.e., air. The gas turbine 2 may include a combustor 6 that combusts a fuel with the compressed air. The gas turbine 2 further may include a turbine 8 that includes several stages of airfoils or turbine blades 9, which convert the energy from the expanding hot gases into rotational mechanical energy. As used herein, the term "blades" will be used to refer to either compressor blades or turbine blades. The turbine 8 also may include diaphragms 10, as shown in FIG. 2, which are stationary components that direct the flow of hot gases onto the turbine blades 9. The gas turbine 2 may include a rotor 11 onto which the compressor blades 5 and turbine blades 9 are mounted. A turbine casing 12 may enclose the gas turbine 2.

As illustrated in FIG. 2, a blade radial deformation monitoring system 20 in accordance with the present invention may include one or more proximity sensors 22 that are spaced around the circumference of a single stage of compressor blades 5 or turbine blades 9. Specifically, the proximity sensors 22 may be mounted in the turbine casing 10 such that the proximity sensors 22 face a stage of compressor blades 5 or, as shown, a stage of turbine blades 9 from an outwardly radial position. In this manner, the proximity sensors 22 may measure the distance from the proximity sensor 22 to the tip of the compressor blade 5 or turbine blade 9, whatever the case may be. In some embodiments, the proximity sensor 22 may be a eddy current sensor, capacitive sensor, microwave sensor, laser sensor, or another similar type of device.

Through conventional means the sensors may be connected to a control system (not shown), which may receive, store and make calculations based on the proximity data acquired by the proximity sensors 22. The control system may comprise any appropriate high-powered solid-state switching device. The control system may be a computer; however, this is merely exemplary of an appropriate high-powered control system, which is within the scope of the application. For example, but not by way of limitation, the control system may include at least one of a silicon controlled rectifier (SCR), a thyristor, MOS-controlled thyristor (MCT) and an insulated gate bipolar transistor. The control system also may be implemented as a single special purpose integrated circuit, such as ASIC, having a main or central processor section for overall, system-level control, and separate sections dedicated performing various different specific combinations, functions and other processes under control of the central processor section. It will be appreciated by those skilled in the art that the control system also may be implemented using a variety of separate dedicated or programmable integrated or other electronic circuits or devices, such as hardwired electronic or logic circuits including discrete element circuits or programmable logic devices, such as PLDs, PALs, PLAs or the like. The control system also may be implemented using a suitably programmed general-purpose computer, such as a microprocessor or microcontrol, or other processor device, such as a CPU or MPU, either alone or in conjunction with one or more peripheral data and signal processing devices.

In use, the blade radial deformation monitoring system 20 may operate as follows. Note that while this example of operation will relate to measuring the deformation of turbine blades 9, those of ordinary skill will recognize that the same general operation methodology may be applied to compressor blades 5. The proximity sensors 22 may take an initial measurement of each of the turbine blades 9 during the startup of the gas turbine 2. As one of ordinary skill in the art will appreciate, surface differences of each of the blades may identify each particular blade to the control system by the profile measured by the proximity sensors 22. Specifically, the minute surface differences of each of the blades may allow the control system to identify the individual blade and, thus, track the deformation of each individual blade. The initial measurement may indicate the initial length of each of the turbine blades 9. This may be determined by the known size and position of the rotor 11 and the distance measured from the proximity sensor 22 to the tip of each of the turbine bladed 9. That is, from these two values the length of the turbine blade 9 may be calculated. The initial measurement data may be stored by the control system.

As the gas turbine 2 operates, a later or second measurement may be taken. These measurements may be taken periodically, for example, they may be taken every second or every minute or every hour or some longer period. The second measurement may indicate the length of each of the turbine blades 9 at the time of the measurement. Again, this length may be determined by the known size and position of the rotor and the distance measured from the proximity sensor 22 to the tip of the turbine blade 9. From these two values the length of the turbine blade 9 may be calculated. The second measurement data may be stored by the control system.

The control system may process the measurement data to determine if the turbine blade 9 has deformed in the radial direction, i.e., whether the turbine blade has "stretched" during use. Specifically, the control system may compare the second measurement to the initial measurement to ascertain the amount of deformation or creep that has occurred. The control system may be programmed to alert a turbine operator once the deformation reaches a certain level. For example, the control system may provide a flashing alert to a certain computer terminal, send an email or a page to a turbine operator or use some other method to alert the turbine operator. This alert may be sent when the level of deformation indicates that the turbine blade 9 is nearing or is at the end of its useful life. At this point, the turbine blades 9 may be pulled from the gas turbine 2 and repaired or replaced.

Figure 3:
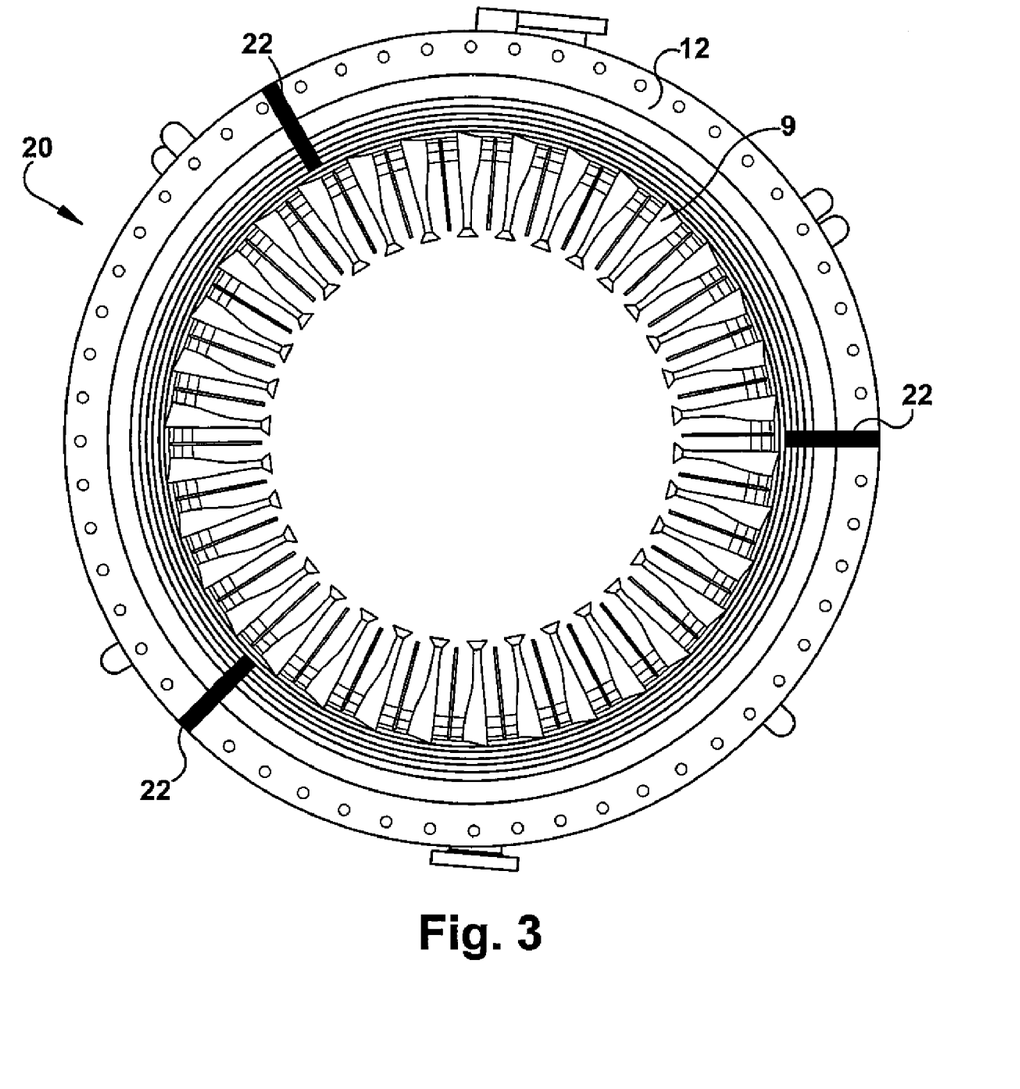
FIG. 3 is a cross-sectional view of the gas turbine of FIG. 1 demonstrating the circumferential placement of the proximity sensors according to an exemplary embodiment of the present invention.

As stated, the blade radial deformation monitoring system 20 may include one or more proximity sensors 22. As illustrated in FIG. 3, the blade radial deformation monitoring system 20 may include three proximity sensors 22 evenly spaced around the circumference of the blades; though, those of ordinary skill in the art will recognize that more or less proximity sensors 20 may be used. The advantage of having multiple sensors is that the relative position of the rotor 11 in the casing 12 may be determined and accounted for in calculating the actual deformation or creep of the blades. Those of ordinary skill in the art will appreciate that changes in the relative position of the rotor with respect to the turbine casing 12 occur due to rotor sag, bearing movement, turbine casing out-of-round and other issues. This displacement may be taken for blade deformation if is not accounted for by the several proximity sensors 22. Thus, the displacement of the blades that may be attributed to rotor movement may be accounted for such that actual blade deformation is determined. For example, in the case of three sensors as shown in FIG. 3, measurement data may indicate that for one of the proximity sensors 22 one of the blades has stretched and for the other two proximity sensors 22 the blade has shrunk. These results indicate that the rotor has displaced inside the casing toward the proximity sensor 22 that shows the stretching. Per conventional methods, the control system may use an algorithm to determine the rotor displacement given the three measurements. Then, the control system may eliminate the rotor displacement to determine the actual radial deformation of each of the blades.

As stated, in some embodiments, only one proximity sensor 22 may be used. In such a system, it may be advantageous to use conventional rotor probes, such as a Bently probe, to determine rotor position. The rotor probes may be positioned at any point on the rotor and may measure the actual radial position of the rotor in real time. As stated, it will be understood by those skilled in the art that the rotor may displace radially during operation. This displacement may appear as deformation of the blades if the actual rotor positioning is not taken into account. If, on the other hand, the actual rotor displacement is calculated by the rotor probes, the control system may calculate the actual deformation of the blades.

Figure 4:
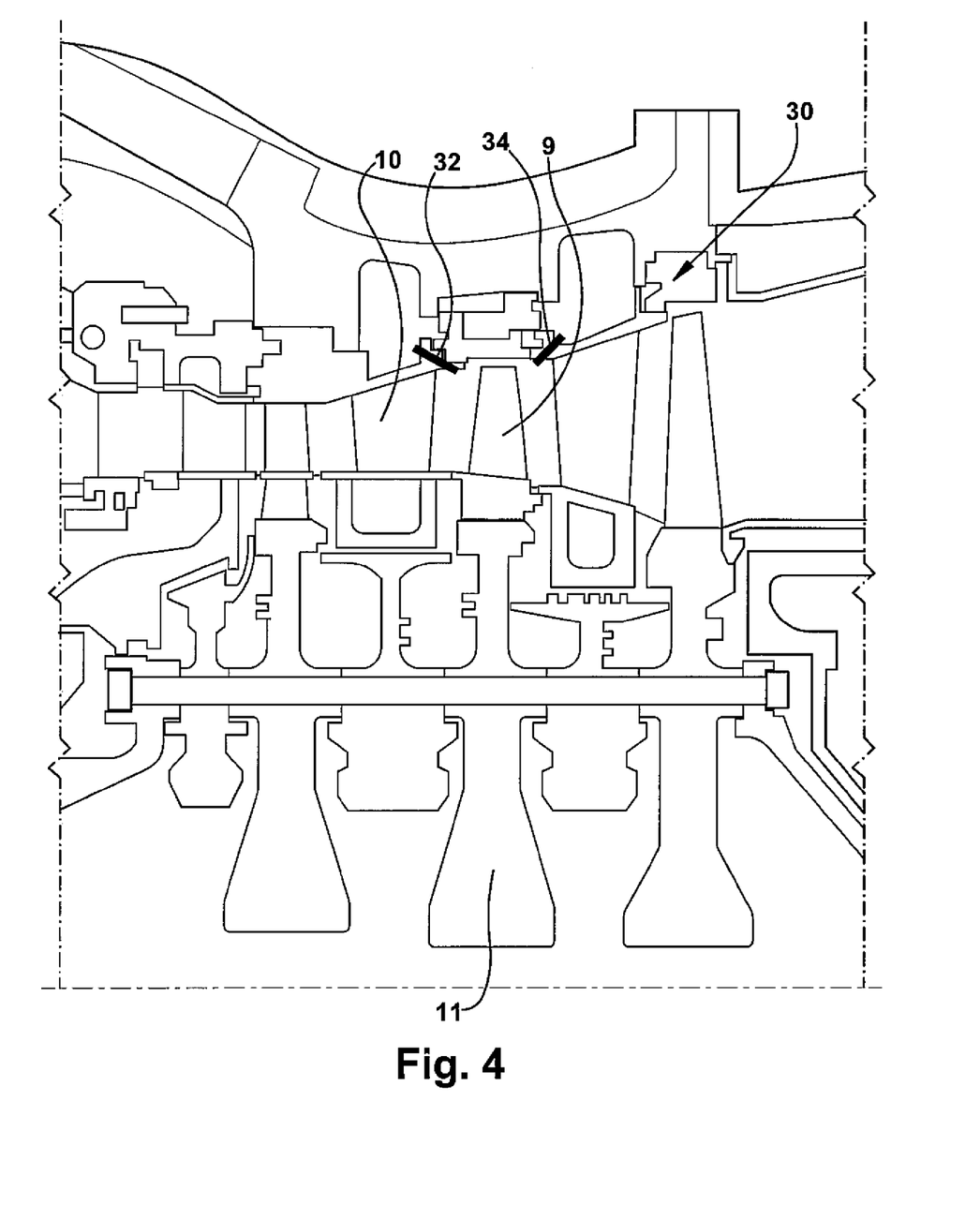
FIG. 4 is a cross-sectional view of the gas turbine of FIG. 1 demonstrating an exemplary embodiment of the present invention.

In some embodiments, the proximity sensors 22 may be located such that they measure axial deformation. As illustrated in FIG. 4, this may be accomplished by placing the proximity sensors 22 in a position such that they are observing the blades from a position that is upstream or in front of the axial position of the blade or from a position that is downstream or behind the axial position of the blade (i.e., the proximity sensors do not look down on the stage, but from an angled position). Thus, a blade axial deformation monitoring system 30 may include an upstream proximity sensor 32, a downstream proximity sensor 34, or both at one or more locations around the circumference of the stage. The upstream proximity sensor 32 may measure the distance from a fixed upstream location in the turbine casing 12 to the side of the blade. Likewise, the downstream proximity sensor 34 may measure the distance from a fixed downstream location in the turbine casing 12 to the side of the blade. Thus, any axial deformation in the upstream or downstream direction of the blade may be determined by examining the successive measurements taken by the upstream proximity sensor 32, the downstream proximity sensor 34, or both.

Similar to the blade radial deformation monitoring system 20, it may be advantageous for the blade axial deformation monitoring system 30 to have multiple proximity sensors 22 spaced about the circumference of the stage. The advantage of having multiple sensors is that the relative position of the rotor may be determined and accounted for in determining the actual axial creep of the blades.

Figure 5:
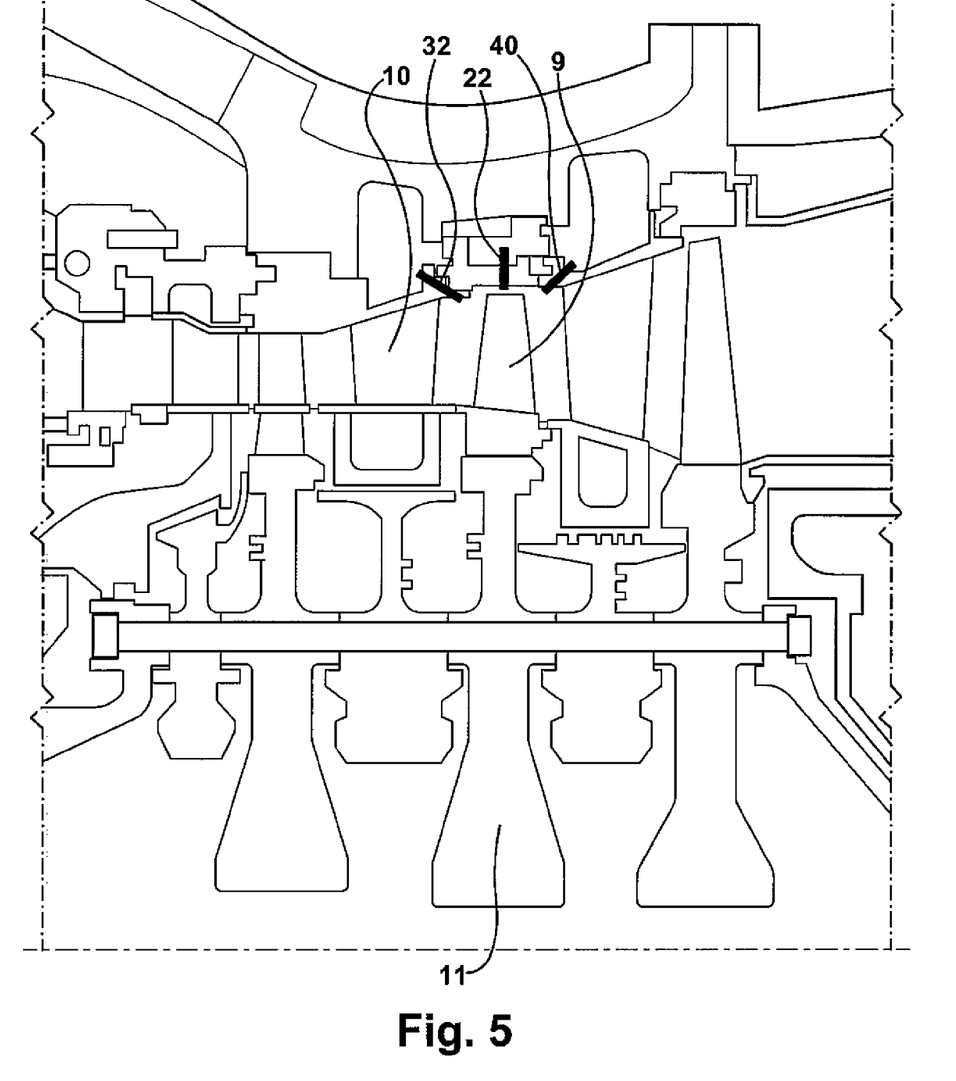
FIG. 5 is a cross-sectional view of the gas turbine of FIG. 1 demonstrating an exemplary embodiment of the present invention.

As illustrated in FIG. 5, in some embodiments, the blade radial deformation monitoring system 20 and/or the blade axial deformation monitoring system 30 may be augmented with conventional infrared pyrometers 40. The infrared pyrometers may provide a thermal profile, which may include a radial temperature profile, of each of the blades. The infrared pyrometers used in such embodiments may be any conventional infrared pyrometer or similar devices. In use, the infrared pyrometers 40 may measure the thermal profile of each of the blades during operation. The control system may track the radial creep as measured by the proximity sensors 22 and/or the axial creep as measured by an upstream proximity sensor 32, and the thermal profile for each of the blades. The thermal profile will allow the control system to determine if any of the blades developed a "hot spot" (i.e., an area of increased temperature) during operation. With this information, the control system may determine if a greater percentage of either the measured axial or radial creep may be attributed to the area of the blade that coincides with the hot spot, as areas of increased temperature undergo deformation or creep at a faster rate. As one of ordinary skill in the art will appreciate, whether the creep is uniform throughout the blade or concentrated affects the anticipated life of the part. Thus, if it is determined that, because of a measured hot spot, the blade likely underwent concentrated creep or deformation, the anticipated life of the part will be decreased. If, on the other hand, it is determined that, because of the absence of any hot spots, the blade likely underwent uniform creep, the anticipated life of the part will not be decreased. In this manner, failure due to concentrated creep may be avoided.

The blade radial deformation monitoring system 20 and/or the blade axial deformation monitoring system 30 that is augmented with conventional infrared pyrometers 40 also may be used to control the operation of the turbine engine such that more efficient and economical operation is realized. As one of ordinary skill in the art will appreciate, generally, the operating life of blades and other hot-path parts are inversely related to the operating temperature of the turbine engine. Thus, generally, if the operating temperature is raised, the operating life of the blades is decreased. Whereas, if the operating temperature is lowered, the operating life of the blades may be extended.

As one of ordinary skill in the art would appreciate, there are instances when it may be necessary and/or more efficient or economical to operate a turbine engine such that higher operating temperatures are experienced through the several stages of blades. For example, in addition to full-load operation (i.e., base load or full power operation), a turbine engine must also be able operate at part-load or turndown conditions. "Turning down" a gas turbine engine involves reducing the fuel flow to the combustor and reducing the inlet air flow to the compressor. Both of these actions reduce the volumetric flow through the first stage nozzle of the turbine. The pressure ratio of the gas turbine is set by the flow-rate through the smallest orifice of the system, i.e., the first stage nozzle, such that by reducing the volumetric flow rate, the pressure ratio of the turbine engine also drops. The pressure ratio of the engine sets the work extracted across the turbine, and therefore the exit temperature from the gas turbine. As the pressure ratio drops, the work extraction drops, and the exhaust temperature rises. The capability of the blades to withstand these elevated temperatures limits the lowest level of turndown achievable by the turbine engine.

Another example where operating the turbine engine at elevated temperatures may be desirable is hot-day operation. A gas turbine must be able operate across a wide range of ambient temperature conditions. As the ambient temperature increases, the mass flow rate into the compressor drops, dropping the volumetric flow rate through the turbine. Because of the relationships stated above, the exhaust temperature of the turbine increases. Again, the capability of the blades to withstand these elevated temperatures limits the operation of the turbine engine when ambient temperatures rise.

As previously described, higher firing temperatures reduce the operating life of hot-gas-path parts, including blades, while lowering firing temperatures extend the operating life of hot-gas-path parts. Conventional methods of calculating the operating life of blades generally are based on the temperature of the exhaust gases. That is, an approximation of the temperatures experienced by the blades is made based on the measured exhaust temperatures. However, such methods lack accuracy. Because of this, significant designs margins are required, which often results in inefficiencies. Specifically, the necessary design margins and the inaccurate operating life predictions based on exhaust temperatures generally result in blades being removed too early—i.e., before the blade's operating life is completely exhausted. On the other hand, if the blade's actually thermal profile and accumulated creep experienced through its usage is recorded and analyzed, a more accurate assessment of the blades operating life may be calculated. In this manner, inefficiency may be avoided and each blades entire operating life may be exhausted. Further, in some instances, information regarding a blade's actual thermal profile and accumulated creep experienced may indicate that a failure is likely to occur before a less accurate method (such as a method the relies on the monitoring of exhaust gas temperatures) would indicate. In these cases, a catastrophic blade failure event may be avoided.

Figure 6:
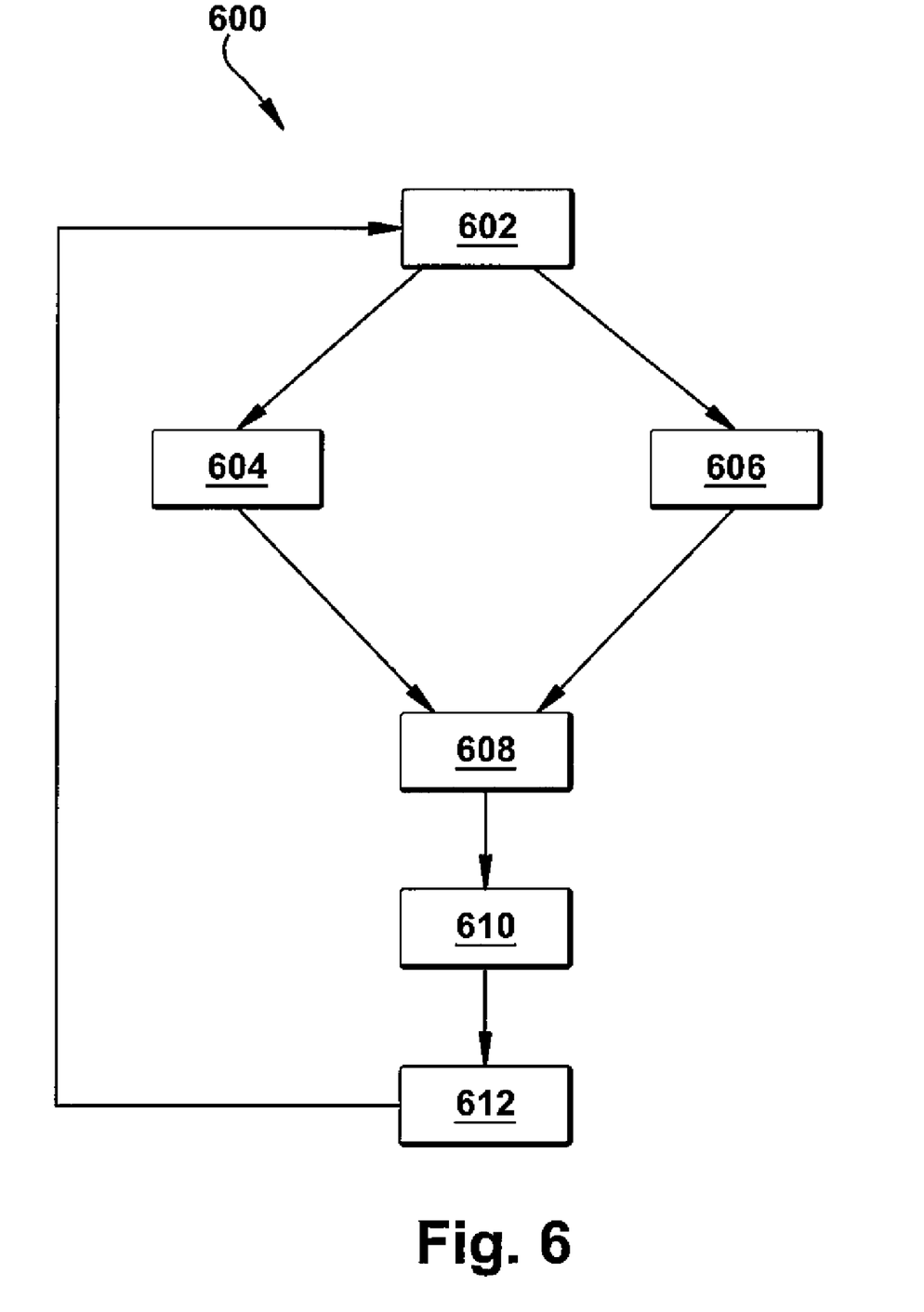
FIG. 6 is a flow diagram demonstrating a method of controlling the operation of a turbine engine according to an exemplary embodiment of the present invention.

FIG. 6 is a flow diagram 600 demonstrating a method of controlling the operation of a turbine engine that includes making a comparison of predicted part cost data and predicted revenue data according to an exemplary embodiment of the present invention. As one of ordinary skill in the art will appreciate, two of the primary (and opposing) considerations for improving, or in some cases, maximizing, the economic performance of a turbine engine generally are: 1) the part life of the turbine blades; and 2) the operating temperature of the turbine engine. Generally, as already described, if the operating temperature of the turbine engine is increased, the operating life of the blades decreases; whereas, if the operating temperature of the turbine engine is decreased, the operating life of the blades increases. In other words, there generally is a cost, which substantially consists of the reduction in the operating life of the blades, associated with raising the operating temperature of the turbine engine. However, there generally also may be increased revenue associated with increased operating temperatures. Higher operating temperatures generally coincide with increased turbine operating efficiencies and at certain times, such as peak hour generation, turn-down operation, or hot-day operation, may result in generating significant additional revenue.

To the extent that the anticipated part costs can be accurately approximated or predicted, it may be compared to any anticipated additional revenue associated with increasing the operating temperature of the turbine engine. In this manner, the turbine operator may make an economically efficient decision as to whether the operating temperature of the turbine engine should be modified. Thus, in general, if the anticipated part cost exceeds the anticipated additional revenue expected from the increased operating temperature, the turbine operator will not increase the operating temperature of the turbine. Whereas, if the anticipated part cost is less than the anticipated additional revenue expected from the increased operating temperature, the turbine operator will increase the operating temperature of the turbine.

An exemplary method according to an embodiment of the current application is illustrated in the flow diagram 600. Initially, at a block 602, the method may determine a prospective operating temperature to analyze. As used herein, "operating temperature of the turbine engine" (or sometimes just "operating temperature") is meant to broadly describe the overall temperature level through the turbine section of a turbine engine or represent an approximation of the axial temperature profile through the turbine section of a turbine engine. As those of ordinary skill in the art will appreciate, the "operating temperature of a turbine" may be described with reference to a single temperature at a specific axial point in the turbine section, though this single temperature measurement is meant general to convey the "operating temperature" of the turbine engine. In some cases, the prospective operating temperature may be an operating temperature that is higher than the current operating temperature of the turbine engine. In other cases, the prospective operating temperature may be an operating temperature that is lower than the current operating temperature of the turbine engine. In some embodiments, the prospective operating temperature may be a temperature that is either slightly higher than or slightly lower than the actual operating temperature of the turbine engine. The prospective operating temperature may be automatically selected by the operating system or may be manually selected by an operator.

From block 602, the method may proceed to a block 604 and a block 606. At block 604, the method may calculate predicted blade part cost data associated with the prospective operating temperature. As discussed in detail below in relation to FIG. 7, this may be calculated by determining the predicted part life of the blades given the prospective operating temperature, which may be determined from the calculated creep rate for the blades. Because of the inverse relationship between blade part life and operating temperatures, the predicted blade part life generally will decrease as the prospective operating temperature increases. Because predicted blade part costs increase as predicted blade part life decreases, predicted blade part costs and operating temperatures have generally have a direct relationship, i.e., as temperatures rise so do part costs.

Concurrently at block 606, through conventional means, predicted revenue data associated with the prospective operating temperature may be calculated. As described, higher operating temperatures generally coincide with increased turbine operating efficiencies and at certain times, such as peak hour generation, turn-down operation, or hot-day operation, may result in generating significant additional revenue. The predicted revenue data may be calculated using conventional means and methods.

The method then may proceed to a block 608 where the predicted blade part cost data calculated in block 604 may be compared to the predicted revenue data calculated in block 606. At a block 610, the results of this comparison then may be compared to the results of same comparison that was completed for the current operating temperature of the turbine engine (which necessarily would have already been completed in a previous cycle) or the results of the same comparison that was completed for another different operating temperature.

From these comparisons, a recommendation may be made at a block 612 as to whether it is economically efficient to modify the operating temperature of the turbine engine to the prospective operating temperature. That is, if the comparison of the predicted blade part cost data to the predicted revenue data for the prospective operating temperature yields a more economical result (i.e., a greater revenue over cost ratio), then a recommendation will be made to the turbine operator that the operating temperature of the turbine engine should be modified to the prospective operating temperature. If, on the other hand, the comparison of the predicted blade part cost data to predicted revenue data for the prospective operating temperature yields a negative economical result (i.e., a decreased revenue over cost ratio), then a recommendation will be made to the turbine operator that the operating temperature of the turbine engine should not be modified to the prospective operating temperature. The recommendation to the system operator may be an automated message to the control system that then may automatically act on the recommendation, or the recommendation may be made to a human operator in the form of a message on a computer screen or other similar communication method. After block 612, the method may cycle back to block 602 where another prospective operating temperature may be determined and analyzed.

Figure 7:
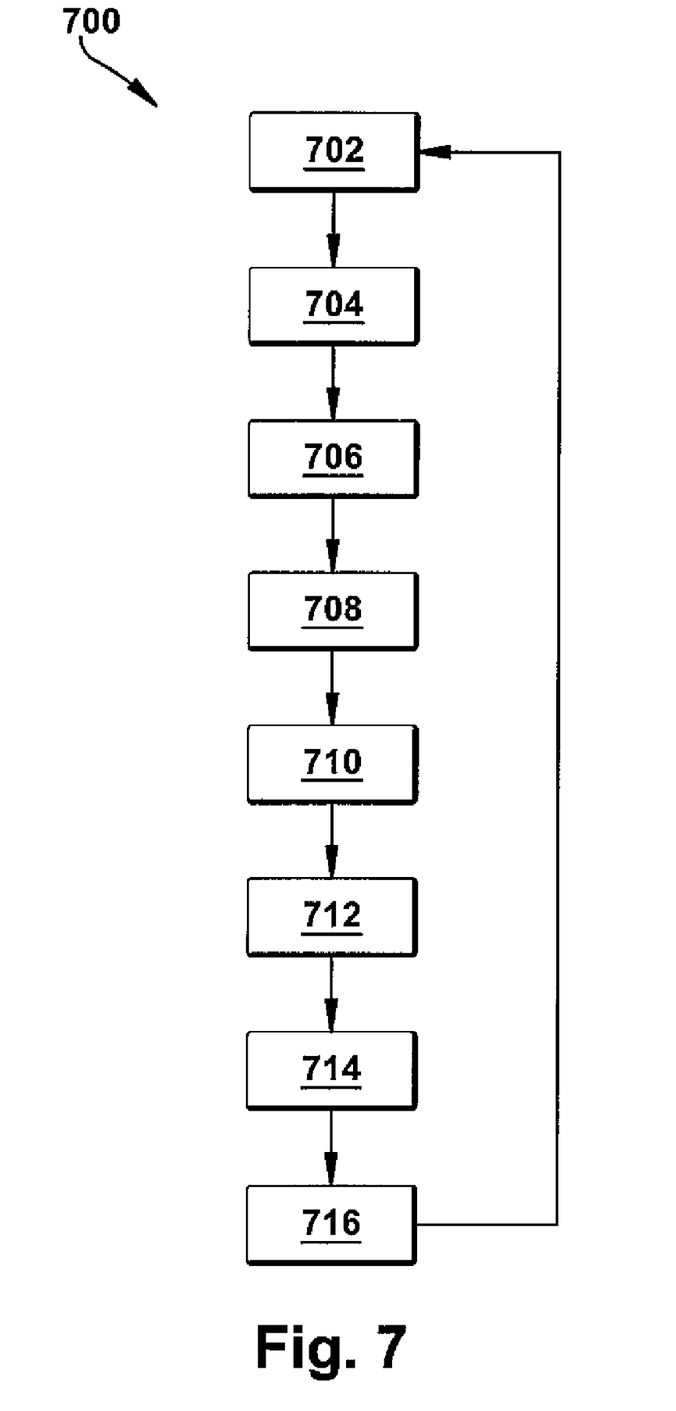
FIG. 7 is a flow diagram demonstrating a method of controlling the operation of a turbine engine according to an exemplary embodiment of the present invention.

As one of ordinary skill in the art will recognize, the effectiveness of the method described above may be enhanced by improving the accuracy of the predicted blade part cost data calculation for each of the prospective operating temperatures. An exemplary method for improving the accuracy of this calculation according to an embodiment of the current application is illustrated in flow diagram 700. As discussed in more detail below, the method of flow diagram 700 includes calibrating or replacing creep calculations for the blades with actual measured creep and measured thermal profiles such that more accurate creep predictions may be made, which will allow for more accurate predicted part life calculations and, in turn, more accurate predicted blade part cost data calculations to be made. Note not all of the steps described below are necessary for the effective employment of the current invention. As the claims of this application indicate, this method may be carried out effectively with the exclusion of one or more of the step demonstrated in flow diagram 700.

In some embodiments, at a block 702, operating conditions data of the turbine engine may be gathered, i.e., collected, analyzed and stored. Operating conditions data may include data related to the operating conditions of the turbine engine, which may include, for example, turbine exhaust temperature, fuel flow rate to the combustor, inlet air flow rate to the compressor, ambient temperature, rotational speed of the turbine, etc. Operating conditions data may include operating conditions data that the blades are experiencing and have experienced during operation. As one of ordinary skill in the art will appreciate, this data may be collected using conventional means and methods.

At a block 704, the radial stress profile for each of the blades may be gathered, i.e., collected, analyzed, calculated and stored. The radial stress profile may be calculated as a function of current rotor speed (collected above as part of block 702) and the known geometry of the blades. As one of ordinary skill in the art will appreciate, the radial stress profile may be determined using conventional means and methods.

At a block 706, current thermal profile data for each of the blades may be gathered, i.e., collected, analyzed and stored. Thermal profile data may include data concerning the radial temperature profile of each of the blades, i.e., temperature readings at different locations along the radial length of each of the blades. Thermal profile data may include radial temperature profile data that the blades are experiencing and have experienced during operation. The collection, analysis and storage of this data may be accomplished by using the monitoring system 20 and/or the blade axial deformation monitoring system 30 augmented with conventional infrared pyrometers 40 and the control system, as described above.

Given the calculated radial stress profile and the actual radial thermal profile for each of the blades, at a block 708, predicted creep rate data for each of the blades may be calculated. This may be done using conventional means and methods. (Note that in some embodiments the predicted creep rate data alone may be used to determine the predicted blade part cost data of step 604 introduced above as part of flow diagram 600. The improved accuracy of using actual radial thermal profiles for the blades will yield improved accuracy over conventional methods.)

At a block 710, measured creep data for each of the blades may be gathered, i.e., collected, analyzed and stored, while the turbine engine is operating. Measured creep data may include data regarding the amount of radial and/or axial creep that the blades are currently experiencing and have experienced (as actually measured), the rate at which the creep is occurring (as actually measured), and the operating and thermal conditions data that coincided with the creep. The collection, analysis and storage of this data may be accomplished by using the blade radial deformation monitoring system 20 and/or the blade axial deformation monitoring system 30 and the control system, as described above. (Note that in some embodiments, the creep rates calculated from the measured creep data alone may be used to determine the predicted blade part cost data of step 604 introduced above as part of flow diagram 600. The improved accuracy of using the actual measured creep rates will yield improved accuracy over conventional methods.)

At a block 712, given the measured creep data for each of the blades and the operating conditions data and the thermal profile data that coincided with the measured creep data, the predicted creep rate data calculations may be calibrated so that they are consistent with the actual measured creep rates of the measured creep data. These calibrated calculations then may be used to calculate calibrated creep rate data, which represents a prediction of future creep rate that takes into account operating conditions data, the thermal profile data, and the actual measured creep rates already experienced by the blades. As the turbine engine continues to operate and more measured creep data is gathered for varying turbine operating conditions data and thermal profile data, the calibrated creep rate data calculation will become more accurate.

At a block 714, using the calibrated creep rate data, a part life may be calculated for each of the turbine blades. As one of ordinary skill in the art will appreciate, the blades may only be deformed by creep so much before they must be replaced. That is, at some point, the creep experienced by the blades reaches a predetermined limit that signifies the end of the blades' useful life. When this limit is reached, the blades must be replaced. Using the calibrated creep rate data, an accurate prediction may be made as how long it will take until the blades reach this limit, which will also provide the rate at which the useful life of the blades is being expended given the particular operating conditions of the turbine.

At a block 716, the rate at which the useful life of the blades is being expended may be used to determine predicted blade part cost data associated with particular turbine operating conditions. The predicted blade part cost data may be the rate at which increments of the useful life of the blade are expended multiplied by the cost to replace the blade. Other hot-path parts may be added to this calculation. This value then may be used in block 604 of flow diagram 600 to more accurately determine if it may be more economically efficient for the turbine to operate at a modified operating temperature. After the blade part cost is calculated, the process may then return to block 702 to complete another calculation.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A method of operating a turbine, the method comprising the steps of:
    gathering thermal profile data for a blade while the turbine operates at different operating temperatures;
    gathering measured creep data for the blade while the turbine operates at the different operating temperatures;
    gathering operating conditions data for the turbine while the turbine operates at the different operating temperatures, including at least a rotational speed of the turbine;
    based on the rotational speed of the turbine at the different operating temperatures, determining the mechanical stress applied to the blade;
    given the thermal profile data for the blade and the mechanical stress applied to the blade, calculating predicted creep rate data for the blade while the turbine operates at the different operating temperatures;
    calibrating the calculation of the predicted creep rate data with the measured creep data for the different operating temperatures;
    calculating calibrated creep rate data for the blade at the different operating temperatures;
    wherein the different operating temperatures include at least a first operating temperature and a second operating temperature; and
    given the calibrated creep rate data for the blade while the turbine operated at the first operating temperature and the calibrated creep rate data for the blade while the turbine operated at the second operating temperature, determining, using a computer, whether operating the turbine at the first operating temperature or the second operating temperature is more economically efficient;
    wherein:
        predicted revenue data comprises data concerning revenue that the turbine earns while operating at the different operating temperatures; and
        the step of determining whether operating the turbine at the first operating temperature or the second operating temperature is more economically efficient includes the step of calculating the predicted revenue data for the turbine at the first operating temperature and the second operating temperature.

2. The method according to claim 1, wherein the step of determining whether operating the turbine at the first operating temperature or the second operating temperature is more economically efficient includes the steps of:
    calculating predicted blade part life data for the different operating temperatures given the calibrated creep rate data and a maximum creep limit of the blade; and
    given the predicted blade part life data, calculating predicted blade part cost data for the different operating temperatures.

3. The method according to claim 2, wherein the predicted blade part cost data approximately comprises the rate at which increments of the useful life of the blade are expended for the different operating temperatures multiplied by a cost to replace the blade.

4. The method according to claim 2, wherein the step of determining whether operating the turbine at the first operating temperature or the second operating temperature is more economically efficient includes the step of comparing a ratio of the predicted blade part cost data to the predicted revenue data for the different operating temperatures.

5. The method according to claim 2, wherein the step of determining whether operating the turbine at the first operating temperature or the second operating temperature is more economically efficient includes the step of comparing a first comparison of the predicted blade part cost data and the predicted revenue data at the first operating temperature to a second comparison of the predicted blade part cost data and the predicted revenue data for the second operating temperature.

6. The method according to claim 1, wherein the gathering of the measured creep data includes the following steps:
    taking an initial measurement of the blade with one or more proximity sensors disposed around the circumference of a stage of blades;
    after the initial measurement, taking a second measurement of the blade with the one or more proximity sensors; and
    making a determination of one of the radial creep and axial creep of the blade by comparing the initial measurement to the second measurement.

7. The method according to claim 6, wherein the initial measurement and second measurement each indicate the distance from a tip of the blade to the one or more proximity sensors.

8. A method of operating a turbine, the method comprising the steps of:
    a) gathering thermal profile data for a blade while the turbine operates at a first operating temperature;
    b) gathering operating conditions data for the turbine while the turbine operates at the first operating temperature, including at least a rotational speed of the turbine while the turbine operates at the first operating temperature;
    c) based on the rotational speed of the turbine, determining the mechanical stress applied to the blade;
    d) given the thermal profile data for the blade and the mechanical stress applied to the blade, calculating predicted creep rate data for the blade while the turbine operates at the first operating temperature;
    e) repeating steps "a" through "d" while the turbine operates at a second operating temperature; and
    f) given the predicted creep rate data for the blade while the turbine operated at the first operating temperature and the predicted creep rate data for the blade while the turbine operated at the second operating temperature, determining, using a computer, whether operating the turbine at the first operating temperature or the second operating temperature is more economically efficient; wherein:

predicted revenue data comprises data concerning revenue that the turbine earns while operating at the different operating temperatures; and the step of determining whether operating the turbine at the first operating temperature or the second operating temperature is more economically efficient includes the step of calculating the predicted revenue data for the turbine at the first operating temperature and the second operating temperature.

9. The method according to claim 8, wherein the step of determining whether operating the turbine at the first operating temperature or the second operating temperature is more economically efficient includes the steps of:

calculating predicted blade part life data for the different operating temperatures given the predicted creep rate data and a maximum creep limit of the blade; and given the predicted blade part life data, calculating predicted blade part cost data for the different operating temperatures.

10. The method according to claim 9, wherein the step of determining whether operating the turbine at the first operating temperature or the second operating temperature is more economically efficient includes the step of comparing a ratio of the predicted blade part cost data to the predicted revenue data for the different operating temperatures.

11. The method according to claim 8, wherein the gathering thermal profile data for the blade includes measuring the thermal profile of the blade with at least one infrared pyrometer.

12. A method of operating a turbine, the method comprising the steps of:

gathering measured creep data for a blade while the turbine operates at different operating temperatures, the measured creep data comprising at least a measured creep rate for the blade;

wherein the different operating temperatures include at least a first operating temperature and a second operating temperature; and given the measured creep data for the blade while the turbine operated at the first operating temperature and the measured creep data for the blade while the turbine operated at the second operating temperature, determining, using a computer, whether operating the turbine at the first operating temperature or the second operating temperature is more economically efficient wherein:

predicted revenue data comprises data concerning revenue that the turbine earns while operating at the different operating temperatures; and the step of determining whether operating the turbine at the first operating temperature or the second operating temperature is more economically efficient includes the step of calculating the predicted revenue data for the turbine at the first operating temperature and the second operating temperature.

13. The method according to claim 12, wherein the step of determining whether operating the turbine at the first operating temperature or the second operating temperature is more economically efficient includes the steps of:

calculating predicted blade part life data for the different operating temperatures given the measured creep data and a maximum creep limit of the blade; and given the predicted blade part life data, calculating predicted blade part cost data for the different operating temperatures.

14. The method according to claim 13, wherein the step of determining whether operating the turbine at the first operating temperature or the second operating temperature is more economically efficient includes the step of comparing a ratio of the predicted blade part cost data to the predicted revenue data for the different operating temperatures.

15. The method according to claim 12, wherein the gathering of the measured creep data includes the following steps:

taking an initial measurement of the blade with one or more proximity sensors disposed around the circumference of a stage of blades;

after the initial measurement, taking a second measurement of the blade with the one or more proximity sensors; and making a determination of one of the radial creep and axial creep of the blade by comparing the initial measurement to the second measurement.

16. The method according to claim 15, wherein the initial measurement and second measurement each indicate the distance from a tip of the blade to the one or more proximity sensors.

* * * * *